(12) United States Patent
Hopper (10) Patent No.: US 11,696,374 B2
(45) Date of Patent: Jul. 4, 2023

(54) SOLID STATE RF OVEN WITH CONTEXT AWARENESS

(71) Applicant: ILLINOIS TOOL WORKS INC., Glenview, IL (US)

(72) Inventor: Christopher Hopper, Buffalo Grove, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 379 days.

(21) Appl. No.: 16/901,288

(22) Filed: Jun. 15, 2020

(65) Prior Publication Data
US 2020/0404751 A1 Dec. 24, 2020

Related U.S. Application Data

(60) Provisional application No. 62/863,436, filed on Jun. 19, 2019.

(51) Int. Cl.
*H05B 6/64* (2006.01)
*H05B 6/68* (2006.01)

(52) U.S. Cl.
CPC .......... *H05B 6/6435* (2013.01); *H05B 6/647* (2013.01); *H05B 6/6467* (2013.01); *H05B 6/68* (2013.01)

(58) Field of Classification Search
CPC .. H05B 6/6435; H05B 6/6438; H05B 6/6441; H05B 6/6447; H05B 6/645; H05B 6/6467; H05B 6/647; H05B 6/6473; H05B 6/6482; H05B 6/6485; H05B 6/668; H05B 6/68; H05B 6/686; H05B 6/687; H05B 6/688; H05B 6/705; Y02B 40/00

USPC .......................... 219/620, 678, 680
See application file for complete search history.

(56) References Cited

U.S. PATENT DOCUMENTS

| | | | |
|---|---|---|---|
| 2013/0092680 A1* | 4/2013 | Cartwright | H05B 6/687 219/622 |
| 2018/0146811 A1* | 5/2018 | Grimaldi | H05B 6/705 |
| 2018/0153000 A1* | 5/2018 | Carcano | H05B 6/645 |
| 2018/0249855 A1* | 9/2018 | Carcano | A47J 27/002 |
| 2018/0372656 A1 | 12/2018 | Ben Haim et al. | |
| 2019/0069133 A1 | 2/2019 | Leindecker et al. | |
| 2020/0170083 A1* | 5/2020 | Zickel | H05B 6/6447 |

OTHER PUBLICATIONS

International Search Report and Written Opinion from International Application No. PCT/US2020/038093 dated Sep. 25, 2020, all enclosed pages cited.

* cited by examiner

*Primary Examiner* — Hung D Nguyen
(74) *Attorney, Agent, or Firm* — Burr & Forman LLP (57) ABSTRACT

An oven may include a cooking chamber configured to receive a food product, a radio frequency (RF) heating system configured to provide RF energy into the cooking chamber using solid state electronic components to heat the food product, and a context awareness engine. The context awareness engine may include processing circuitry configured to receive RF signature data (including measurements of at least forward power and reflected power) associated with provision of RF energy into the cooking chamber, and to correlate an RF signature with a phenomenon observed with respect to the food product to define a signature profile for the phenomenon observed.

18 Claims, 7 Drawing Sheets

SOLID STATE RF OVEN WITH CONTEXT AWARENESS

TECHNICAL FIELD

Example embodiments generally relate to ovens and, more particularly, relate to an oven that uses radio frequency (RF) heating provided by solid state electronic components and is able to determine context information within the oven based on closed loop feedback.

BACKGROUND

Microwave ovens have been in use for decades. Although the ability of microwave ovens to apply heat quickly has never been doubted, the relatively indiscriminate bombarding of the food product, which generally occurs in microwave cooking, has been notorious for uneven heating. To provide for the use of controllable RF energy that can enable a much more fine-tuned control of the cooking process, solid state RF ovens have been developed more recently. This fine-tuned control of the cooking process can lead to superior results in vastly shortened time periods. However, the use of RF energy within a cooking chamber of an oven may also enable a number of other possibilities that would be impossible in connection with conventional microwave ovens.

BRIEF SUMMARY OF SOME EXAMPLES

In an example embodiment, an oven is provided. The oven may include a cooking chamber configured to receive a food product, an RF heating system configured to provide RF energy into the cooking chamber using solid state electronic components to heat the food product, and a context awareness engine. The context awareness engine may include processing circuitry configured to receive RF signature data (including measurements of at least forward power and reflected power) associated with provision of RF energy into the cooking chamber, and to correlate an RF signature with a phenomenon observed with respect to the food product to define a signature profile for the phenomenon observed.

In another example embodiment, a method of operating an oven having a cooking chamber configured to receive a food product may be provided. The oven may have an RF heating system configured to provide RF energy into the cooking chamber using solid state electronic components to heat the food product. The method may include receiving current RF signature data responsive to a cooking operation being performed on the food product in the cooking chamber, performing a comparison of the current RF signature data to a library of signature profiles, and classifying context information based on the comparison.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, new possibilities with respect to the functional capabilities of ovens may be possible with the use of RF energy within a cooking chamber of an oven. Some example embodiments may provide an oven that can effectively and accurately determine context information associated with the cooking chamber of the oven. In this regard, example embodiments may employ feedback that can be obtained responsive to the application of RF energy into the cooking chamber in order to effectively become context aware with regard to the contents and activities occurring within the oven. Thus, for example, the oven may become contextually aware with respect to detecting specific situations or phenomena within the oven. After becoming contextually aware, the oven can be further configured to take various actions with respect to the context information that is learned. Thus, the oven may be both contextually aware, and contextually responsive.

As noted above, the ability to become context aware may be, at least in part, a result of being able to obtain feedback on the reflected power within the cooking chamber. By knowing the forward power and the reflected power within the cooking chamber, a closed loop feedback system may be created. The feedback may essentially generate a dynamic series of RF signatures within the cooking chamber. Example embodiments may therefore be configured to detect a number of different situations (or, more broadly, contexts), based on reading the RF signatures. Each respective context may correlate to a unique RF signature or pattern of signature changes, which can be monitored over time. Some examples describing these solutions will be discussed below in reference to FIGS. 6-9. However, first a further description of the environmental context in which this problem arose will be discussed in reference to FIGS. 1-5.

Figure 1:
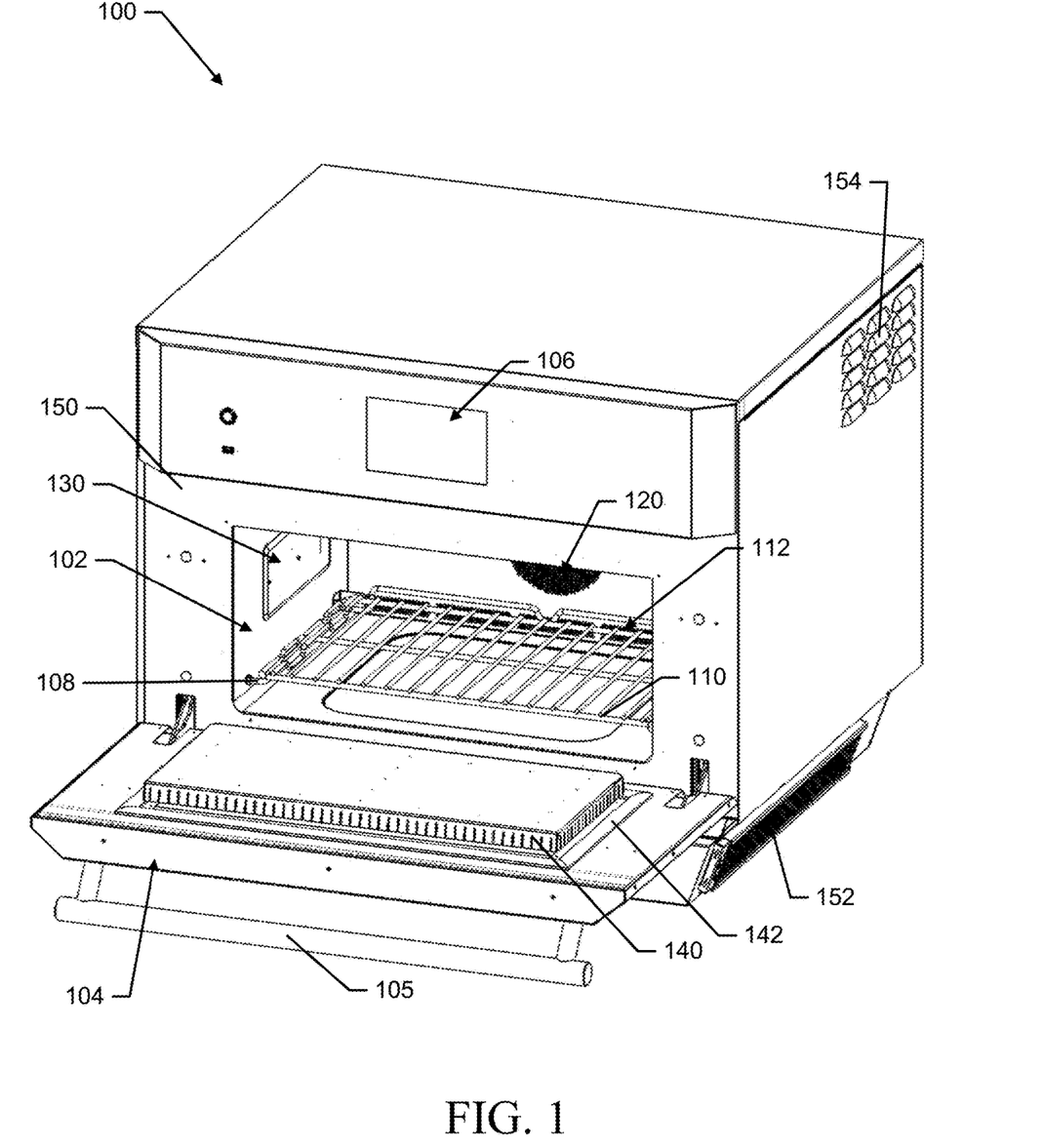
FIG. 1 illustrates a perspective view of an oven capable of employing at least two energy sources according to an example embodiment.

FIG. 1 illustrates a perspective view of an oven 100 according to an example embodiment. As shown in FIG. 1, the oven 100 may include a cooking chamber 102 into which a food product (or multiple food products) may be placed for the application of heat by any of at least two energy sources that may be employed by the oven 100. The cooking chamber 102 may include a door 104 and an interface panel 106, which may sit proximate to the door 104 when the door 104 is closed. The door 104 may be operable via handle 105, which may extend across the front of the oven 100 parallel to the ground. In some cases, the interface panel 106 may be located substantially above the door 104 (as shown in FIG. 1) or alongside the door 104 in alternative embodiments. In an example embodiment, the interface panel 106 may include a touch screen display capable of providing visual indications to an operator and further capable of receiving touch inputs from the operator. The interface panel 106 may be one example of a mechanism by which instructions are provided to the operator, and the mechanism by which feedback is provided to the operator regarding cooking process status, options and/or the like. However, it should be appreciated that information could also be provided (e.g., wirelessly or via wired connection) to other device such as laptop computers, smart phones, or other computers, servers, or the like.

In some embodiments, the oven 100 may include multiple racks or may include rack (or pan) supports 108 or guide slots in order to facilitate the insertion of one or more racks 110 or pans holding food product that is to be cooked. In an example embodiment, air delivery orifices 112 may be positioned proximate to the rack supports 108 (e.g., just below a level of the rack supports in one embodiment) to enable heated air to be forced into the cooking chamber 102 via a heated-air circulation fan (not shown in FIG. 1). The heated-air circulation fan may draw air in from the cooking chamber 102 via a chamber outlet port 120 disposed at a back or rear wall (i.e., a wall opposite the door 104) of the cooking chamber 102. Air may be circulated from the chamber outlet port 120 back into the cooking chamber 102 via the air delivery orifices 112. After removal from the cooking chamber 102 via the chamber outlet port 120, air may be cleaned, heated, and pushed through the system by other components prior to return of the clean, hot and speed controlled air back into the cooking chamber 102. This air circulation system, which includes the chamber outlet port 120, the air delivery orifices 112, the heated-air circulation fan, cleaning components, and all ducting therebetween, may form a first air circulation system within the oven 100.

In an example embodiment, food product placed on a pan or one of the racks 110 (or simply on a base of the cooking chamber 102 in embodiments where racks 110 are not employed) may be heated at least partially using radio frequency (RF) energy applied by solid state RF devices, as described herein. Meanwhile, the airflow that may be provided may be heated to enable further heating or even browning to be accomplished. However, heating by hot air is entirely optional, and is not required for example embodiments. Of note, pans of numerous different types of materials may be employed. As such, in some cases, even a metallic pan may be placed on one of the rack supports 108 or racks 110 of some example embodiments. However, the oven 100 may be configured to employ frequencies and/or mitigation strategies for detecting and/or preventing any arcing that might otherwise be generated by using RF energy with metallic components.

In an example embodiment, the RF energy may be delivered to the cooking chamber 102 via an antenna assembly 130 disposed proximate to the cooking chamber 102. In some embodiments, multiple components may be provided in the antenna assembly 130, and the components may be placed on opposing sides of the cooking chamber 102. The antenna assembly 130 may include one or more instances of a power amplifier, a launcher, waveguide and/or the like that are configured to couple RF energy into the cooking chamber 102.

The cooking chamber 102 may be configured to provide RF shielding on five sides thereof (e.g., the top, bottom, back, and right and left sides), but the door 104 may include a choke 140 to provide RF shielding for the front side. The choke 140 may therefore be configured to fit closely with the opening defined at the front side of the cooking chamber 102 to prevent leakage of RF energy out of the cooking chamber 102 when the door 104 is shut and RF energy is being applied into the cooking chamber 102 via the antenna assembly 130.

In an example embodiment, a gasket 142 may be provided to extend around the periphery of the choke 140. In this regard, the gasket 142 may be formed from a material such as wire mesh, rubber, silicon, or other such materials that may be somewhat compressible between the door 104 and a periphery of the opening into the cooking chamber 102. The gasket 142 may, in some cases, provide a substantially air tight seal. However, in other cases (e.g., where the wire mesh is employed), the gasket 142 may allow air to pass therethrough. Particularly in cases where the gasket 142 is substantially air tight, it may be desirable to provide an air cleaning system in connection with the first air circulation system described above.

The antenna assembly 130 may be configured to generate controllable RF emissions (i.e., forward power transmissions) into the cooking chamber 102 using solid state components. Thus, the oven 100 may not employ any magnetrons, but instead use only solid state components for the generation and control of the RF energy applied into the cooking chamber 102. The use of solid state components may provide distinct advantages in terms of allowing the characteristics (e.g., power/energy level, phase and frequency) of the RF energy to be controlled to a greater degree than is possible using magnetrons. However, since relatively high powers are necessary to cook food, the solid state components themselves will also generate relatively high amounts of heat, which must be removed efficiently in order to keep the solid state components cool and avoid damage thereto. To cool the solid state components, the oven 100 may include a second air circulation system. The antenna assembly 130 may also be able to receive or detect power that is reflected within the cooking chamber 102 (i.e., reflected power) that is not absorbed within the food product. A comparison of reflected power to forward power may provide an indication of efficiency, but may also be location specific within the cooking chamber 102 to provide an RF signature, as described in greater detail below.

The second air circulation system may operate within an oven body 150 of the oven 100 to circulate cooling air for preventing overheating of the solid state components that power and control the application of RF energy to the cooking chamber 102. The second air circulation system may include an inlet array 152 that is formed at a bottom (or basement) portion of the oven body 150. In particular, the basement region of the oven body 150 may be a substantially hollow cavity within the oven body 150 that is disposed below the cooking chamber 102. The inlet array 152 may include multiple inlet ports that are disposed on each opposing side of the oven body 150 (e.g., right and left sides when viewing the oven 100 from the front) proximate to the basement, and also on the front of the oven body 150 proximate to the basement. Portions of the inlet array 152 that are disposed on the sides of the oven body 150 may be formed at an angle relative to the majority portion of the oven body 150 on each respective side. In this regard, the portions of the inlet array 152 that are disposed on the sides of the oven body 150 may be tapered toward each other at an angle of about twenty degrees (e.g., between ten degrees and thirty degrees). This tapering may ensure that even when the oven 100 is inserted into a space that is sized precisely wide enough to accommodate the oven body 150 (e.g., due to walls or other equipment being adjacent to the sides of the oven body 150), a space is formed proximate to the basement to permit entry of air into the inlet array 152. At the front portion of the oven body 150 proximate to the basement, the corresponding portion of the inlet array 152 may lie in the same plane as (or at least in a parallel plane to) the front of the oven 100 when the door 104 is closed. No such tapering is required to provide a passage for air entry into the inlet array 152 in the front portion of the oven body 150 since this region must remain clear to permit opening of the door 104.

From the basement, ducting may provide a path for air that enters the basement through the inlet array 152 to move upward (under influence from a cool-air circulating fan) through the oven body 150 to an attic portion inside which control electronics (e.g., the solid state components) are located. The attic portion may include various structures for ensuring that the air passing from the basement to the attic and ultimately out of the oven body 150 via outlet louvers 154 is passed proximate to the control electronics to remove heat from the control electronics. Hot air (i.e., air that has removed heat from the control electronics) is then expelled from the outlet louvers 154. In some embodiments, outlet louvers 154 may be provided at right and left sides of the oven body 150 and at the rear of the oven body 150 proximate to the attic. Placement of the inlet array 152 at the basement and the outlet louvers 154 at the attic ensures that the normal tendency of hotter air to rise will prevent recirculation of expelled air (from the outlet louvers 154) back through the system by being drawn into the inlet array 152. Furthermore, the inlet array 152 is at least partially shielded from any direct communication path from the outlet louvers 154 by virtue of the fact that, at the oven sides (which include both portions of the inlet array 152 and outlet louvers 154), the shape of the basement is such that the tapering of the inlet array 152 is provided on walls that are also slightly inset to create an overhang that blocks any air path between inlet and outlet. As such, air drawn into the inlet array 152 can reliably be expected to be air at ambient room temperature, and not recycled, expelled cooling air.

Figure 2:
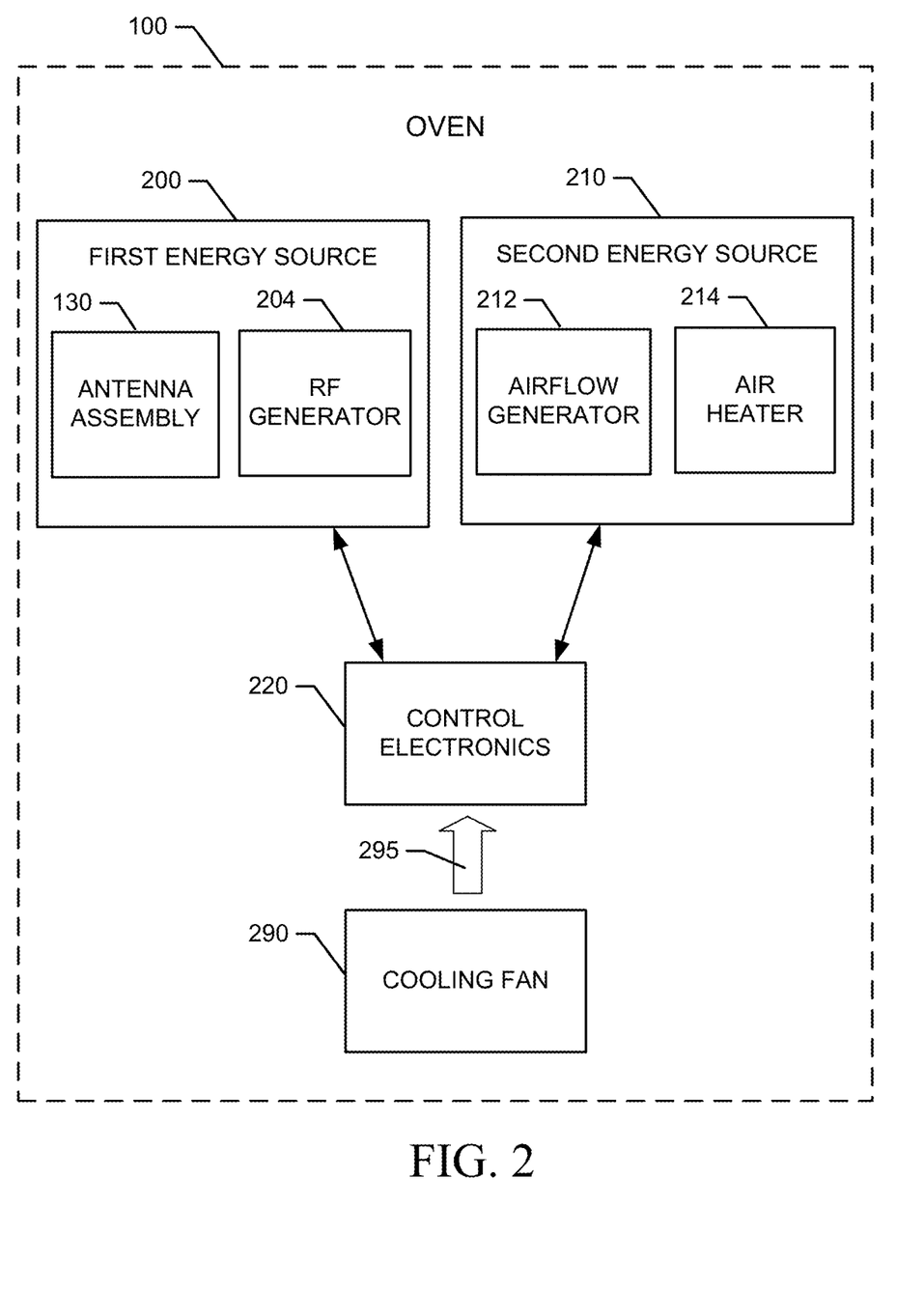
FIG. 2 illustrates a functional block diagram of the oven of FIG. 1 according to an example embodiment.

FIG. 2 illustrates a functional block diagram of the oven 100 according to an example embodiment. As shown in FIG. 2, the oven 100 may include at least a first energy source 200 and, in some cases, may also include a second energy source 210. If both are employed, the first and second energy sources 200 and 210 may each correspond to respective different cooking methods. In some embodiments, the first and second energy sources 200 and 210 may be an RF heating source and a convective heating source, respectively. However, it should be appreciated that additional or alternative energy sources may also be provided in some embodiments. Moreover, some example embodiments could be practiced in the context of an oven that includes only a single energy source (e.g., the first energy source 200). As such, example embodiments could be practiced on an oven that only uses solid state RF cooking (and no convection). However, it may be expected that many examples will employ both the first and second energy sources 200 and 210.

As mentioned above, the first energy source 200 may be an RF energy source (or RF heating source) configured to generate relatively broad spectrum RF energy or a specific narrow band, phase controlled energy source to cook food product placed in the cooking chamber 102 of the oven 100. Thus, for example, the first energy source 200 may include the antenna assembly 130 and an RF generator 204. The RF generator 204 of one example embodiment may be configured to generate RF energy at selected levels and with selected frequencies and phases. In some cases, the frequencies may be selected over a range of about 6 MHz to 246 GHz. However, other RF energy bands may be employed in some cases. In some examples, frequencies may be selected from unlicensed frequency (e.g., the ISM) bands for application by the RF generator 204.

In some cases, the antenna assembly 130 may be configured to transmit the RF energy into the cooking chamber 102 (e.g., forward power) and receive feedback (e.g., reflected power) to indicate absorption levels of respective different frequencies in the food product. The absorption levels may then be used to control the generation of RF energy to provide balanced cooking of the food product. Cooking based on feedback indicative of absorption levels is not necessarily employed in all embodiments however. For example, some embodiments may employ algorithms for selecting frequency and phase based on pre-determined strategies identified for particular combinations of selected cook times, power levels, food types, recipes and/or the like. In some embodiments, the antenna assembly 130 may include multiple antennas, waveguides, launchers, and RF transparent coverings that provide an interface between the antenna assembly 130 and the cooking chamber 102. Thus, for example, four waveguides may be provided and, in some cases, each waveguide may receive RF energy generated by its own respective power module or power amplifier of the RF generator 204 operating under the control of control electronics 220. In an alternative embodiment, a single multiplexed generator may be employed to deliver different energy into each waveguide or to pairs of waveguides to provide energy into the cooking chamber 102.

In an example embodiment, if employed, the second energy source 210 may be an energy source capable of inducing browning and/or convective heating of the food product. Thus, for example, the second energy source 210 may a convection heating system including an airflow generator 212 and an air heater 214. The airflow generator 212 may be embodied as or include the heated-air circulation fan or another device capable of driving airflow through the cooking chamber 102 (e.g., via the air delivery orifices 112). The air heater 214 may be an electrical heating element or other type of heater that heats air to be driven toward the food product by the airflow generator 212. Both the temperature of the air and the speed of airflow will impact cooking times that are achieved using the second energy source 210, and more particularly using the combination of the first and second energy sources 200 and 210.

In an example embodiment, the first and second energy sources 200 and 210 may be controlled, either directly or indirectly, by the control electronics 220. The control electronics 220 may be configured to receive inputs descriptive of the selected recipe, food product and/or cooking conditions in order to provide instructions or controls to the first and second energy sources 200 and 210 to control the cooking process. In some embodiments, the control electronics 220 may be configured to receive static and/or dynamic inputs regarding the food product and/or cooking conditions. Dynamic inputs may include feedback data regarding phase and frequency of the RF energy applied to the cooking chamber 102, and reflected back (thereby indicating absorption in the contents of the cooking chamber 102). In some cases, dynamic inputs may include adjustments made by the operator during the cooking process. The static inputs may include parameters that are input by the operator as initial conditions. For example, the static inputs may include a description of the food type, initial state or temperature, final desired state or temperature, a number and/or size of portions to be cooked, a location of the item to be cooked (e.g., when multiple trays or levels are employed), a selection of a recipe (e.g., defining a series of cooking steps) and/or the like. As will be discussed in greater detail below, some static information may actually be determinable by the control electronics 220 (e.g., food item location) based on the dynamic inputs (i.e., the feedback).

In some embodiments, the control electronics 220 may be configured to also provide instructions or controls to the airflow generator 212 and/or the air heater 214 to control airflow through the cooking chamber 102. However, rather than simply relying upon the control of the airflow generator 212 to impact characteristics of airflow in the cooking chamber 102, some example embodiments may further employ the first energy source 200 to also apply energy for cooking the food product so that a balance or management of the amount of energy applied by each of the sources is managed by the control electronics 220.

In an example embodiment, the control electronics 220 may be configured to access algorithms and/or data tables that define RF cooking parameters used to drive the RF generator 204 to generate RF energy at corresponding levels, phases and/or frequencies for corresponding times determined by the algorithms or data tables based on initial condition information descriptive of the food product and/or based on recipes defining sequences of cooking steps. As such, the control electronics 220 may be configured to employ RF cooking as a primary energy source for cooking the food product, while the convective heat application is a secondary energy source for browning and faster cooking. However, other energy sources (e.g., tertiary or other energy sources) may also be employed in the cooking process.

In some cases, cooking programs or recipes may be provided to define the cooking parameters to be employed for each of multiple potential cooking stages or steps that may be defined for the food product and the control electronics 220 may be configured to access and/or execute the cooking programs or recipes (all of which may generally be referred to herein as recipes). In some embodiments, the control electronics 220 may be configured to determine which recipe to execute based on inputs provided by the user except to the extent that dynamic inputs (i.e., changes to cooking parameters while a program is already being executed) are provided. In an example embodiment, an input to the control electronics 220 may also include browning instructions. In this regard, for example, the browning instructions may include instructions regarding the air speed, air temperature and/or time of application of a set air speed and temperature combination (e.g., start and stop times for certain speed and heating combinations). The browning instructions may be provided via a user interface accessible to the operator, or may be part of the recipes.

As discussed above, the first air circulation system may be configured to drive heated air through the cooking chamber 102 to maintain a steady cooking temperature within the cooking chamber 102. Meanwhile, the second air circulation system may cool the control electronics 220. The first and second air circulation systems may be isolated from each other. However, each respective system generally uses differential pressures (e.g., created by fans) within various compartments formed in the respective systems to drive the corresponding air flows needed for each system. While the airflow of the first air circulation system is aimed at heating food in the cooking chamber 102, the airflow of the second air circulation system is aimed at cooling the control electronics 220. As such, cooling fan 290 provides cooling air 295 to the control electronics 220, as shown in FIG. 2.

The structures that form the air cooling pathways via which the cooling fan 290 cools the control electronics 220 may be designed to provide efficient delivery of the cooling air 295 to the control electronics 220, but also minimize fouling issues or dust/debris buildup in sensitive areas of the oven 100, or areas that are difficult to access and/or clean. Meanwhile, the structures that form the air cooling pathways may also be designed to maximize the ability to access and clean the areas that are more susceptible to dust/debris buildup. Furthermore, the structures that form the air cooling pathways via which the cooling fan 290 cools the control electronics 220 may be designed to strategically employ various natural phenomena to further facilitate efficient and effective operation of the second air circulation system. In this regard, for example, the tendency of hot air to rise, and the management of high pressure and low pressure zones necessarily created by the operation of fans within the system may each be employed strategically by the design and placement of various structures to keep certain areas that are hard to access relatively clean and other areas that are otherwise relatively easy to access more likely to be places where cleaning is needed.

Figure 3:
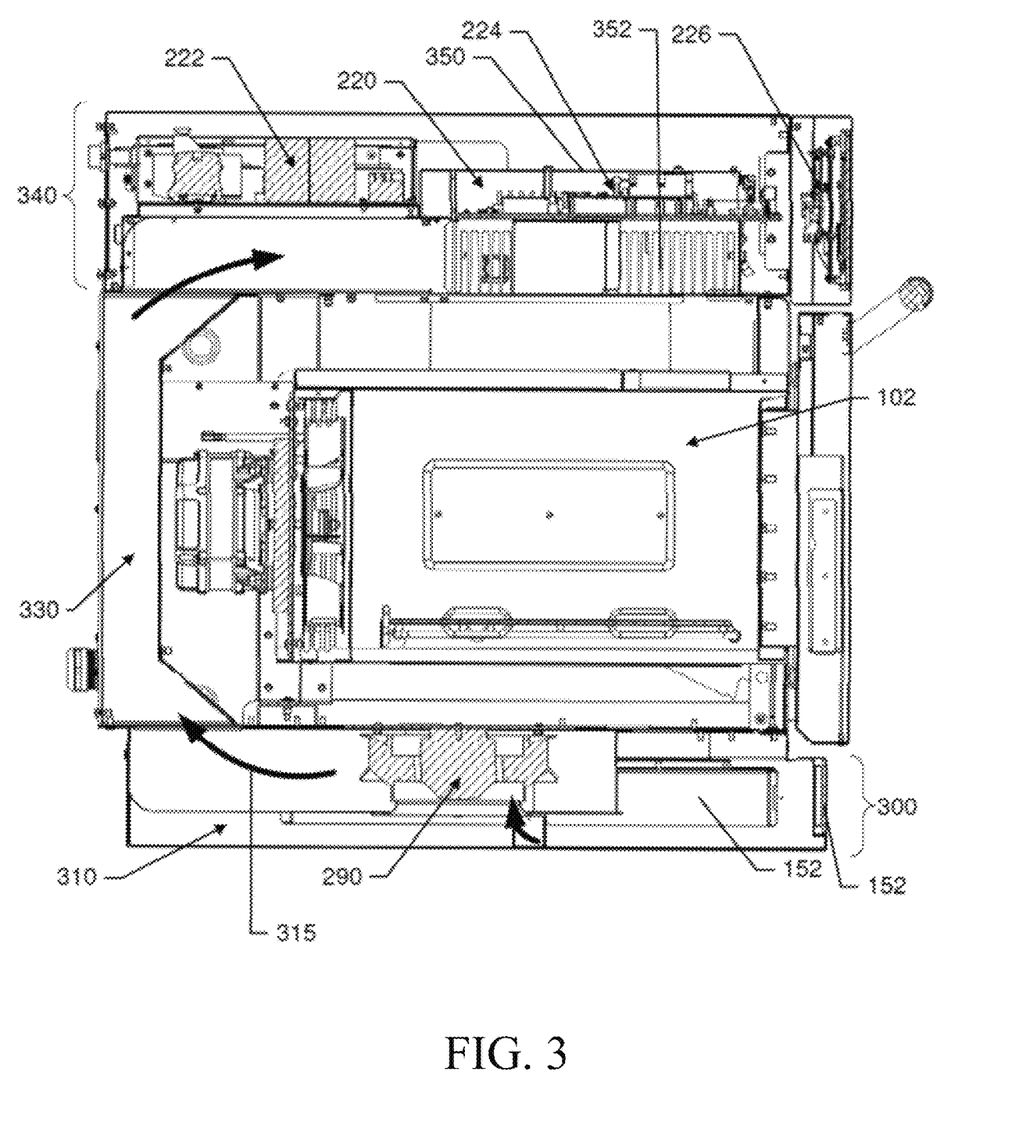
FIG. 3 shows a cross sectional view of the oven from a plane passing from the front to the back of the oven according to an example embodiment.

The typical airflow path, and various structures of the second air circulation system, can be seen in FIG. 3. In this regard, FIG. 3 shows a cross sectional view of the oven 100 from a plane passing from the front to the back of the oven 100. The basement (or basement region 300) of the oven 100 is defined below the cooking chamber 102, and includes an inlet cavity 310. During operation, air is drawn into the inlet cavity 310 through the inlet array 152 and is further drawn into the cooling fan 290 before being forced radially outward (as shown by arrow 315) away from the cooling fan 290 into a riser duct 330 (e.g., a chimney) that extends from the basement region 300 to the attic (or attic region 340) to turn air upward (as shown by arrow 315). Air is forced upward through the riser duct 330 into the attic region 340, which is where components of the control electronics 220 are disposed. The air then cools the components of the control electronics 220 before exiting the body 150 of the oven 100 via the outlet louvers 154. The components of the control electronics 220 may include power supply electronics 222, power amplifier electronics 224 and display electronics 226.

Upon arrival of air into the attic region 340, the air is initially guided from the riser duct 330 to a power amplifier casing 350. The power amplifier casing 350 may house the power amplifier electronics 224. In particular, the power amplifier electronics 224 may sit on an electronic board to which all such components are mounted. The power amplifier electronics 224 may therefore include one or more power amplifiers that are mounted to the electronic board for powering the antenna assembly 130. Thus, the power amplifier electronics 224 may generate a relatively large heat load. To facilitate dissipation of this relatively large heat load, the power amplifier electronics 224 may be mounted to one or more heat sinks 352. In other words, the electronic board may be mounted to the one or more heat sinks 352. The heat sinks 352 may include large metallic fins that extend away from the circuit board to which the power amplifier electronics 224 are mounted. Thus, the fins may extend downwardly (toward the cooking chamber 102). The fins may also extend in a transverse direction away from a centerline (from front to back) of the oven 100 to guide air provided into the power amplifier casing 350 and past the fins of the heat sinks 352.

Figure 4:
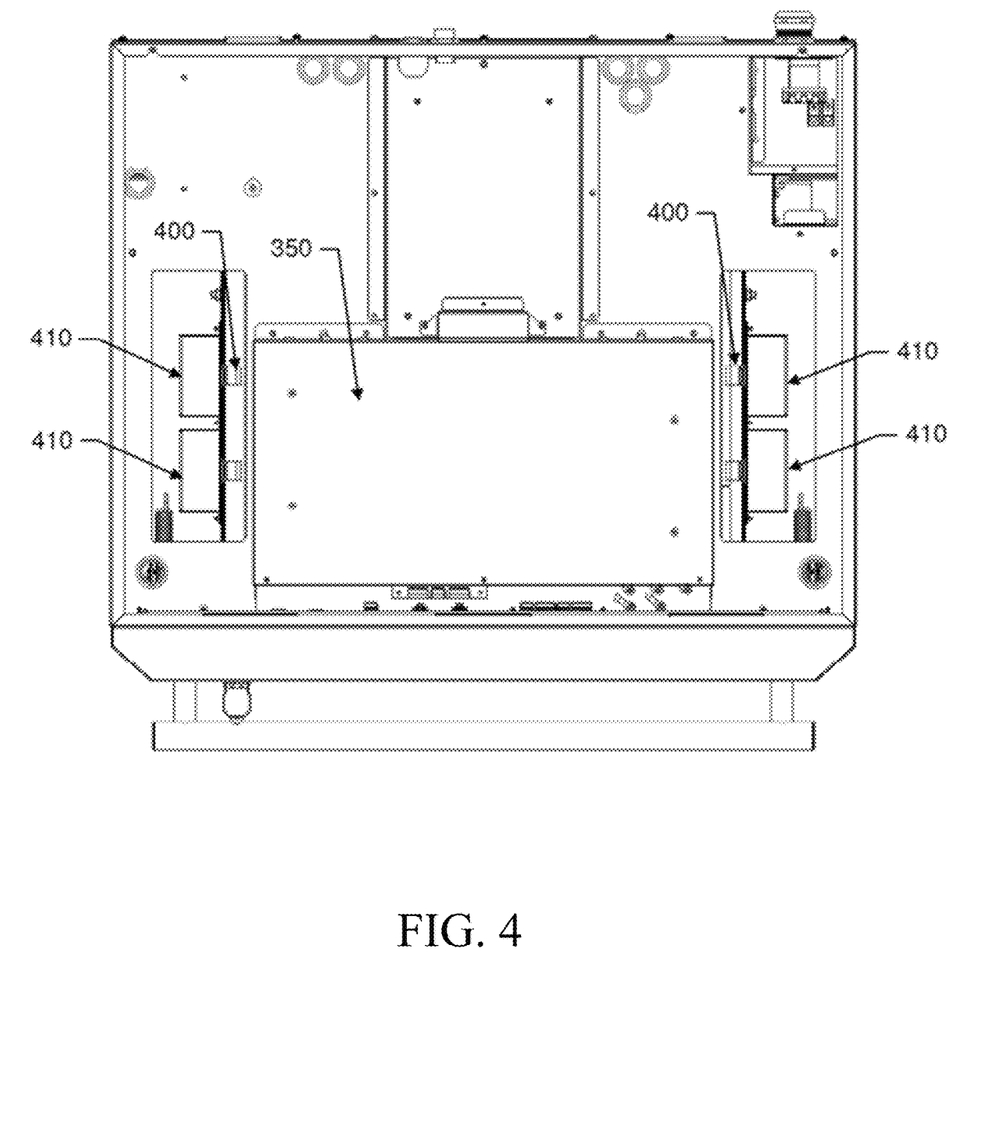
FIG. 4 is a top view of an attic region of the oven in accordance with an example embodiment.

FIG. 4 illustrates a top view of the attic region 340, and shows the power amplifier casing 350 and various components of the antenna assembly 130 including a launcher assembly 400 and waveguides of a waveguide assembly 410. Power is provided from the power amplifier electronics 224 to each launcher of the launcher assembly 400. The launcher assembly 400 operably couples a signal generated by the power amplifiers of the power amplifier electronics 224 into a corresponding one of the waveguides of the waveguide assembly 410 for communication of the corresponding signal into the cooking chamber 102 via the antenna assembly 130 as described above. The launcher assembly 400 may include one or more antennas that can be used to insert energy into the cooking chamber 102 and obtain feedback readings on reflected power within the cooking chamber 102. The reflected power measurements, and the knowledge of the input power transmitted into the cooking chamber 102 can be used for efficiency calculations, but can also (due to the spatially different locations of the individual antennas) create an ability to have spatial awareness to the phenomena occurring in the cooking chamber 102. The measurements, and their spatial relationship may be used as RF signature data that can be analyzed and used as described herein.

The power amplifier electronics 224 are defined by a plurality of electronic circuitry components including opamps, transistors and/or the like that are configured to generate waveforms at the corresponding power levels, frequencies and phases that are desired for a particular situation or cooking program. In some cases, the cooking program may select an algorithm for control of the power amplifier electronics 224 to direct RF emissions into the cooking chamber 102 at selected power levels, frequencies and phases. One or more learning processes may be initiated to select one or more corresponding algorithms to guide the power application. The learning processes may include detection of feedback on the efficacy of the application of power at specific frequencies (and/or phases) into the cooking chamber 102. In order to determine the efficacy, in some cases, the learning processes may measure efficiency and compare the efficiency to one or more thresholds. Efficiency may be calculated as the difference between forward power ($P_{fwd}$) and reflected power ($P_{refl}$), divided by the forward power ($P_{fwd}$). As such, for example, the power inserted into the cooking chamber 102 (i.e., the forward power) may be measured along with the reflected power to determine the amount of power that has been absorbed in the cooking chamber 102 and/or the contents (or workload) inserted in the cooking chamber 102. The contents inserted into the cooking chamber 102 may include the food product, the walls of the cooking chamber 102, the cookware supporting the food product and anything else inside the cooking chamber 102. The efficiency may then be calculated as: Efficiency (eff)=$(P_{fwd}-P_{refl})/P_{fwd}$.

As can be appreciated from the description above, the measurement of the efficiency of the delivery of RF energy to the cooking chamber 102 may be useful in determining how effective a particular (e.g., a current) selection for a combination (or pair) of frequency and phase parameters of RF energy applied into the cooking chamber 102 is at delivering heat energy to the food product. Thus, the measurement of efficiency may be useful for selecting the best combination or algorithm for application of energy. The measurement of efficiency should therefore also desirably be as accurate as possible in order to ensure that meaningful control is affected by monitoring efficiency. It is also important to appreciate that distinguishing between the amount of RF energy that is absorbed in each separate one of the items listed above (i.e., walls of the cooking chamber 102, cookware, food product, etc.) can be useful in determining how to most effectively cook the food product.

However, the measurement of efficiency in practical use in a given instance of the cooking chamber 102 has demonstrated that certain phenomena tend to produce similar patterns of changes in the measurements that can be used in the measurement of efficiency. Accordingly, certain phenomena can be said to have respective different RF signatures that can be identified not only after the fact, but potentially also in real time. Moreover, certain repeatable phenomena tend to result in similar contributions to RF signatures. For example, cookware of the same type that is always placed at the same location may be expected to have the same repeatable impacts on efficiency measurements. The same thing may be said for the walls of the cooking chamber 102, and certain identically formed food products. This similarity in RF signatures or contributions thereto may enable distinct contributions to be associated with each specific item to be determined from any given RF signature in some cases. Accordingly, the control electronics 220 (or other electronics within the oven 100 that can be configured to record and/or analyze recorded data) may be configured to learn to read the RF signatures that are evident from the data being recorded and determine the contextual information that each respective RF signature is indicative of. For example, temperature changes, phase changes, food product location, types and locations of cookware, and various other contextual information can be determined from reading recorded data and detecting the occurrence of RF signatures that correlate to each respective item of contextual information.

Figure 5:
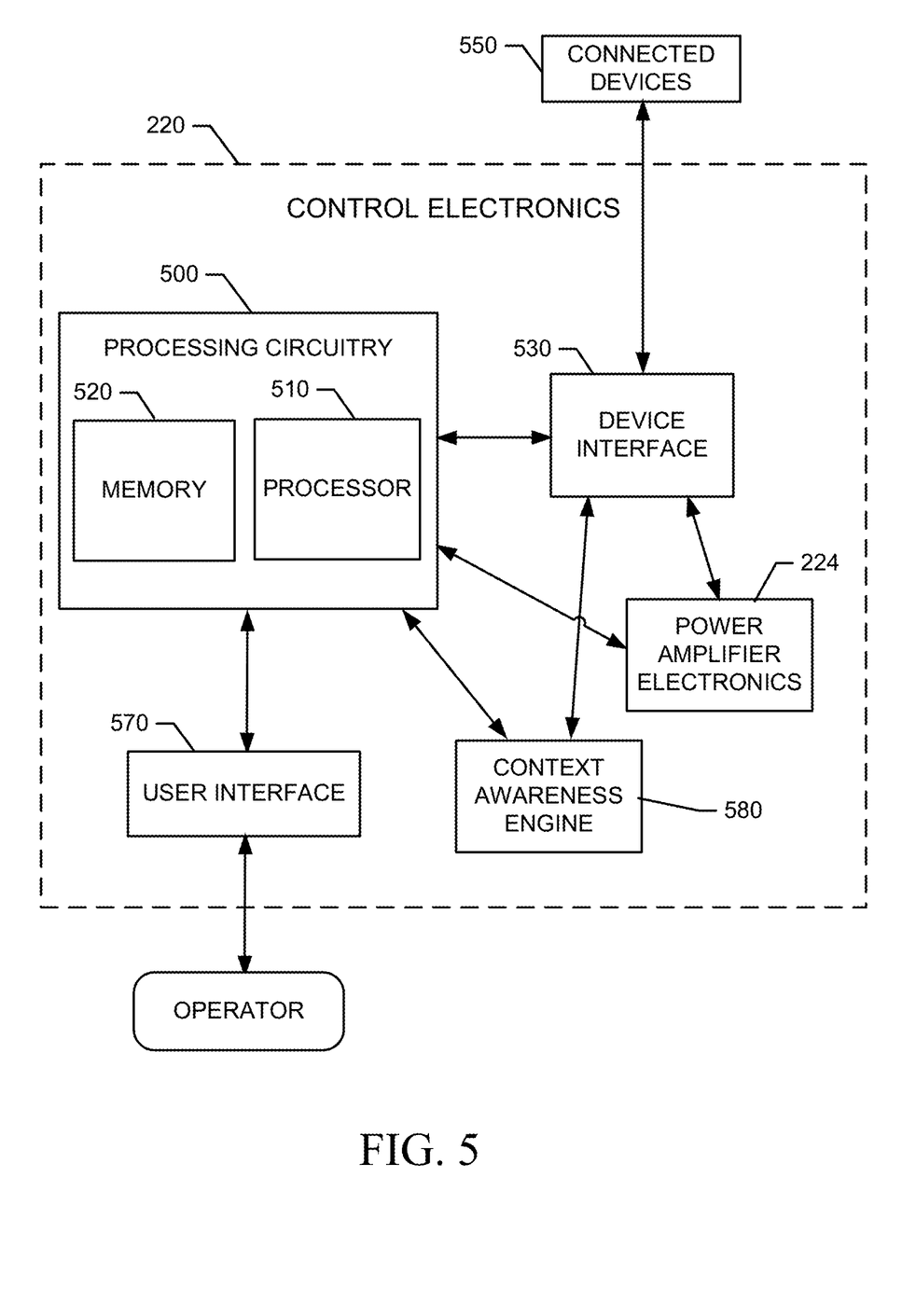
FIG. 5 is a block diagram of control electronics including a context awareness engine according to an example embodiment.

FIG. 5 illustrates a block diagram of control electronics 220 that may be further with electronic circuitry for instantiation of a context awareness engine in accordance with an example embodiment. In some embodiments, the control electronics 220 may include or otherwise be in communication with processing circuitry 500 that is configurable to perform actions in accordance with example embodiments described herein. As such, for example, the functions attributable to the control electronics 220 may be carried out by the processing circuitry 500.

The processing circuitry 500 may be configured to perform data processing, control function execution and/or other processing and management services according to an example embodiment of the present invention. In some embodiments, the processing circuitry 500 may be embodied as a chip or chip set. In other words, the processing circuitry 500 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 500 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 500 may include one or more instances of each of a processor 510 and memory 520 that may be in communication with or otherwise control a device interface 530 and the user interface 570. As such, the processing circuitry 500 may be embodied as a circuit chip (e.g., an integrated circuit chip) configured (e.g., with hardware, software or a combination of hardware and software) to perform operations described herein. However, in some embodiments, the processing circuitry 500 may be embodied as a portion of an on-board computer.

The user interface 570 (which may be embodied as, include, or be a portion of the interface panel 106) may be in communication with the processing circuitry 500 to receive an indication of a user input at the user interface 570 and/or to provide an audible, visual, mechanical or other output to the user (or operator). As such, the user interface 570 may include, for example, a display (e.g., a touch screen such as the interface panel 106), one or more hard or soft buttons or keys, and/or other input/output mechanisms.

The device interface 530 may include one or more interface mechanisms for enabling communication with connected device 550 such as, for example, other components of the oven 100, sensors of a sensor network of the oven 100, removable memory devices, wireless or wired network communication devices, and/or the like. In some cases, the device interface 530 may be any means such as a device or circuitry embodied in either hardware, or a combination of hardware and software that is configured to receive and/or transmit data from/to sensors that measure any of a plurality of device parameters such as frequency, phase, temperature (e.g., in the cooking chamber 102 or in air passages associated with the second energy source 210), air speed, and/or the like. As such, in one example, the device interface 530 may receive input at least from a temperature sensor that measures the temperatures described above, or receives input from any of the other parameters described above, in order to enable communication of such parameters to the processing circuitry 500 for the performance of certain protective or control functions. Alternatively or additionally, the device interface 530 may provide interface mechanisms for any devices capable of wired or wireless communication with the processing circuitry 500. In still other alternatives, the device interface 530 may provide connections and/or interface mechanisms to enable the processing circuitry 500 to control the various components of the oven 100.

In an exemplary embodiment, the memory 520 may include one or more non-transitory memory devices such as, for example, volatile and/or non-volatile memory that may be either fixed or removable. The memory 520 may be configured to store information, data, cooking signatures, programs, recipes, applications, instructions or the like for enabling the control electronics 220 to carry out various functions in accordance with example embodiments of the present invention. For example, the memory 520 could be configured to buffer input data for processing by the processor 510. Additionally or alternatively, the memory 520 could be configured to store instructions for execution by the processor 510. As yet another alternative, the memory 520 may include one or more databases that may store a variety of data sets responsive to input from the sensor network, or responsive to programming of any of various cooking programs. Among the contents of the memory 520, applications may be stored for execution by the processor 510 in order to carry out the functionality associated with each respective application. In some cases, the applications may include control applications that utilize parametric data to control the application of heat by the first and second energy sources 200 and 210 as described herein. In this regard, for example, the applications may include operational guidelines defining expected cooking speeds for given initial parameters (e.g., food type, size, initial state, location, and/or the like) using corresponding tables of frequencies, phases, RF energy levels, temperatures and air speeds. Thus, some applications that may be executable by the processor 510 and stored in memory 520 may include tables defining combinations of RF energy parameters and air speed and temperature to determine cooking times for certain levels of doneness and/or for the execution of specific cooking recipes. Accordingly, different cooking programs can be executed to generate different RF and/or convective environments to achieve the desired cooking results. In still other examples, data tables may be stored to define calibration values and/or diagnostic values, as described above. Alternatively or additionally, the memory 520 may store applications for defining responses to stimuli including the generation of protective actions and/or notification functions. In some example embodiments, the memory 520 may store RF signature data gathered based on feedback from the application of RF energy to food products as well as previously stored and previously classified RF signature data (e.g., signature profiles) for use, analysis and/or comparison as described in greater detail below. Additionally or alternatively, data can be sent to central location, e.g. the cloud, for analysis, optimization, and distribution to other locations.

The processor 510 may be embodied in a number of different ways. For example, the processor 510 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 510 may be configured to execute instructions stored in the memory 520 or otherwise accessible to the processor 510. As such, whether configured by hardware or by a combination of hardware and software, the processor 510 may represent an entity (e.g., physically embodied in circuitry—such as in the form of processing circuitry 500) capable of performing operations according to example embodiments of the present invention while configured accordingly. Thus, for example, when any instance of the processor 510 is embodied as an ASIC, FPGA or the like, the processor 510 may be specifically configured hardware for conducting the operations described herein. Alternatively, as another example, when the processor 510 is embodied as one or more executors of software instructions, the instructions may specifically configure the processor 510 to perform the operations described herein.

In an example embodiment, the processor 510 (or the processing circuitry 500) may be embodied as, include or otherwise control the control electronics 220, the power amplifier electronics 224, and or context awareness engine 580. As such, in some embodiments, the processor 510 (or the processing circuitry 500) may be said to cause each of the operations described in connection with the control electronics 220, the power amplifier electronics 224 and/or the context awareness engine 580 by directing the control electronics 220, the power amplifier electronics 224 and/or the context awareness engine 580, respectively, to undertake the corresponding functionalities responsive to execution of instructions or algorithms configuring the processor 510 (or processing circuitry 500) accordingly. As an example, the control electronics 220 may be configured to control the responses to various stimuli associated with executing the learning procedure discussed above and directing RF application within the oven 100 based on the learning procedure. Moreover, the control electronics 220 may be configured to determine efficiency parameters and take protective actions based on the efficiency parameters, or based on individual ones of the values, measurements and/or parameters that are determined by or received at the control electronics 220 for execution of the learning procedure. Additionally or alternatively, the control electronics 220 (e.g., via the context awareness engine 580) may be configured to compare RF signature data to stored signature profiles to determine if/when specific context information is applicable based on the comparison. In some cases, a separate instance of a processor (or processors) and memory may be associated with different parts of the control electronics 220 (e.g., including separate processors for the control of the power amplifier electronics 224 and the context awareness engine 580 amongst potentially others).

In an example embodiment, the control electronics 220 may also access and/or execute instructions for control of the RF generator 204 and/or the antenna assembly 130 to control the application of RF energy to the cooking chamber 102. Thus, for example, the operator may provide static inputs to define the type, mass, quantity, or other descriptive parameters (e.g., a recipe) related to the food product(s) disposed within the cooking chamber 102. The control electronics 220 may then utilize the static inputs to locate an algorithm or other program for execution to define the application of RF energy and/or convective energy to be applied within the cooking chamber 102. The control electronics 220 may also monitor dynamic inputs to modify the amount, frequency, phase or other characteristics of the RF energy to be applied within the cooking chamber 102 during the cooking process, and may also perform protective functions. The control electronics 220 may execute instructions for calibration or fault analysis. Accordingly, for example, the control electronics 220 may be configured to act locally to protect the power amplifier electronics 224 via stopping RF application to the cooking chamber 102, via making adjustments to components to provide calibrated outputs, and/or via alerting the user when various abnormal or correctable situations are detected. The control electronics 220 may also or alternatively execute instructions for measuring or recording RF signature data (e.g., feedback measurement data associated with efficiency, forward power ($P_{fwd}$) or reflected power ($P_{refl}$)), and determining context information for the cooking chamber 102 based on the RF signature data. The context information can be used to drive alerts or otherwise inform the operator of the context information, or to drive automatic functions. For example, the context information may be used to suggest cooking time(s) based on minimal input from the user. In particular, when accessing information stored in a database (internal or cloud-based), the cooking time could be automatically calculated based at least in part on the context information.

In some embodiments, efficiency calculations may be made periodically throughout the cooking process as part of a learning process. In this regard, the control electronics 220 may be configured to extrapolate, calculate or otherwise determine the amount of energy to be directed into food product (i.e., forward power value 520), and the amount of energy reflected back from the cooking chamber 102 (i.e., the reflected power value 522) so that an accurate estimate of the absorbed power (or energy) can be estimated, and the efficiency parameter can be determined. The control electronics 220 may then control operation of the RF generator 204 and/or the antenna assembly 130 based on the measured efficiency as part of a calibration or cooking process. Thus, for example, if a learning process is performed during cooking, the measured efficiency may be expected to be at least above a threshold value (e.g., 40%) whenever there is a food product or load in the cooking chamber 102. If efficiency is below the threshold value, the control electronics 220 may communicate with the user interface 570 to let the user know to check the cooking chamber 102 to make sure that there is a load therein. Discrete efficiency measurements may be made at any desirable interval (e.g., every 100 msec) to perform the protective or alert functions, if certain criteria are met. However, the recording of such efficiency measurements also provides a large amount of RF signature data that can be analyzed by the context awareness engine 580 as described herein. If certain RF signatures are detected, it can be determined that specific context information associated with the contents of the cooking chamber 102 must be applicable. In this way, in general terms, data can be recorded or monitored and compared to known profile information (e.g., signature profiles) to determine whether any observed phenomena can be classified as specific context information. The specific context information determine can then be used, if desired or programmed accordingly, in any of a number of different ways. For example, specific automatic responses may be taken in response to some context information. In other examples, information may be provided to the user to prompt user action or otherwise inform the user. In still other examples, information may be passed on for further analysis to determine whether any new phenomenon that was not previously classified can now be classified. Other function execution options (e.g., manual or automatic) may then be associated with the newly classified phenomenon.

Figure 6:
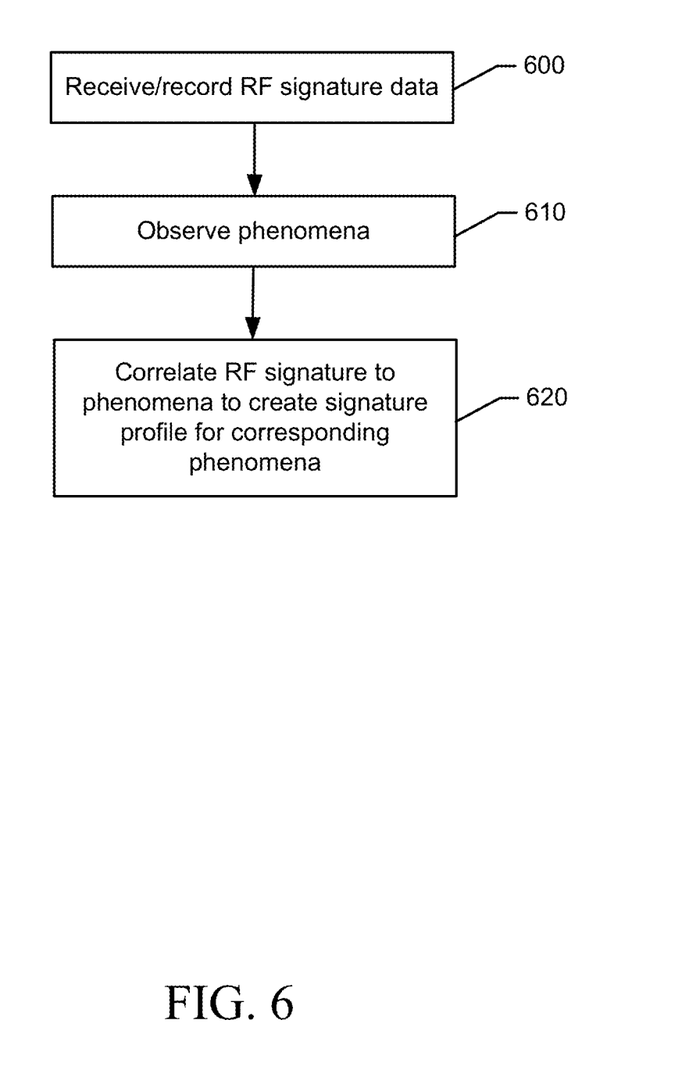
FIG. 6 is a block diagram showing a training process for the context awareness engine in accordance with an example embodiment.
Figure 7:
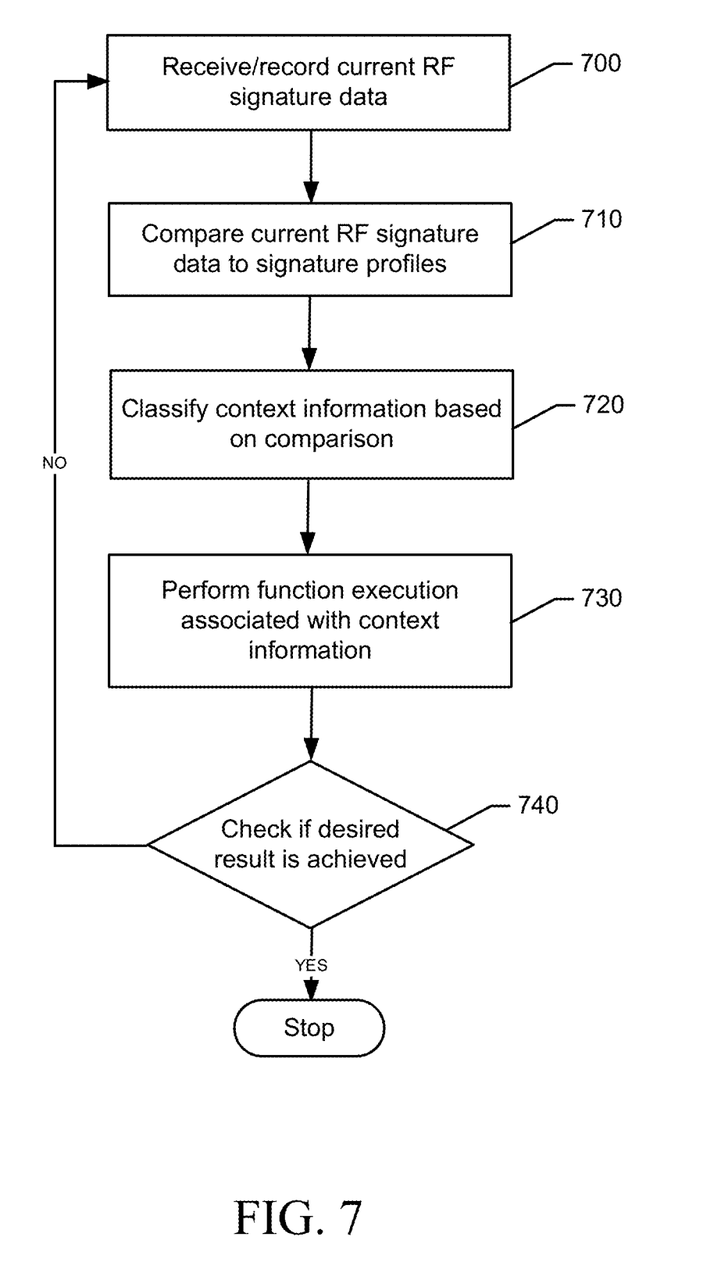
FIG. 7 illustrates a method for use of a trained context awareness engine in accordance with an example embodiment.

FIGS. 6 and 7 each illustrate a block diagram of various actions that may occur responsive to operation of the context awareness engine 580 of an example embodiment. In this regard, FIG. 6 illustrates a process of creating signature profiles in accordance with an example embodiment, and FIG. 7 illustrates a process of using created signature profiles to employ function execution in accordance with an example embodiment. Of note, the processes of FIGS. 6 and 7 may run independent of each other at respective different times on one machine or on different machines. For example, the processes of FIG. 6 may be performed on test platforms (e.g., in test kitchens) in order to classify as many phenomena as possible to create a library of signature profiles. The library can then be implemented on other platforms (e.g., distributed ovens) in isolation or in a network-connected context. Alternatively, a single platform can be configured to run the processes of FIGS. 6 and 7 either simultaneously or sequentially in any series of orders. In this regard, FIG. 6 shows a block diagram of a training process for the context awareness engine 580 according to an example embodiment, and FIG. 7 shows a block diagram corresponding to use of a trained context awareness engine 580.

Referring first to FIG. 6, the context awareness engine 580 may be configured to receive and/or record RF signature data at operation 600. The RF signature data may include efficiency calculations, forward power ($P_{fwd}$), reflected power ($P_{refl}$) and/or other types of data that may be available based on the sensors or equipment of the oven 100. The RF signature data may be received or recorded while food product (including one or more loads and, in some cases, the pans, racks, containers or other accessories that support the loads) is being heated in the cooking chamber 102 by the application of RF energy. The RF signature data may be time stamped, or may otherwise be recorded in such a way as to permit correlation of the RF signature data with specific times or periods of time during which RF energy is applied by the first energy source 200 (e.g., via the antenna assembly 130). At operation 610, phenomena may be observed either by an operator or based on analysis of data from sensors, etc. For example, image data, temperature data, chef or other operator input, and/or the like may be used to define specific events or situations involving the food product. Based on the observed phenomena and the RF signature data, correlations may be made to create an RF signature profile for certain phenomena at operation 620. In this regard, for example, machine learning techniques and/or operator input may be employed to correlate observed phenomena to the RF signature data that corresponds therewith to define the correlated RF signature data as a signature profile for the respective phenomena. As a result, multiple correlated RF signatures and their respective phenomena (i.e., signature profiles) may be recorded or stored (e.g., in the memory 520) in a library as a library of signature profiles.

The creation of signature profiles may happen in either an offline or online capacity. Thus, ovens may actually learn to make new signature profiles on the fly or during operation using machine learning techniques. However, in some cases, ovens may only be able to work with previously stored signature profiles. For example, the library of signature profiles may be necessary to preload into the oven 100 in order to enable the oven to compare current RF signature data to the preloaded signature profiles to detect context information associated with the food product within the oven 100 currently.

When machine learning is employed, dynamic changes in efficiency, forward power ($P_{fwd}$), reflected power ($P_{refl}$) or other measurable characteristics can be evaluated relative to the information such changes are known to demonstrate in either general food products, or the specific food product type that is currently loaded into the cooking chamber 102. Given the fixed dimensions of the cooking chamber 102, even across separate instances of the oven 100 where the same size and shape characteristics are employed for the cooking chamber 102, the RF signature data can be expected to be relatively consistent for food products that are equally consistent in size, shape, consistency, etc. However, a challenge occurs when slight variations are present in size, shape, consistency, or even locational placement within the cooking chamber 102.

Machine learning can employ information regarding multiple (including a relative multitude) of data sets to identify how the slight variations discussed above can impact the RF signature data detected by the context awareness engine 580. Over time, the variations themselves can be recognized or reconciled so that, for example, some variations can actually be classified or identified based on the RF signature data itself. In effect, the context awareness engine 580 learns to read RF signature data and make inferences about the corresponding context (i.e., type, composition, location, temperature, doneness level, orientation, phase change (in progress or about to happen) and various other contextual parameters that are associated with the food product) within the cooking chamber 102 that likely caused the variations (if not the exact signature) that is currently demonstrated within the cooking chamber 102.

As an example, a phase change within the food product (or within one component of a multi-component food product) is relatively easy to detect and has a very strong signature, whereas simple temperature changes are less obvious, although still detectable. In this regard, as a component is heated, the energy absorption (which is correlated to efficiency measurements) may be relatively steady, or change slowly as temperature of the component increases. However, for a given type of component, or specific component, there may be differences in the signatures that are detectable. The RF signatures for each component in a multi-component food product may therefore change differently during heating, and the changes can be tuned into by the context awareness engine 580 to detect the temperature change of each component. Thus, doneness level on a component by component basis can be monitored, and machine learning can be used to more closely correlate the RF signature data to actual temperature estimates, and corresponding levels of doneness. This can allow the current RF signature data to be compared to a plurality of signature profiles (each indicative of different context information) to determine the current context (e.g., of the food product) within the cooking chamber 102.

As such, temperature changes can be detected within one or more components of the food product (or within multiple loads (or instances of) the food product) by monitoring efficiency changes, or changes in forward power ($P_{fwd}$) or reflected power ($P_{refl}$) in a spatially consistent environment. Thus, temperature and doneness level can be monitored during cooking so that, for example, a target temperature or doneness level could be achieved. Given that these changes and variations can be subtle, and impacted by a number of factors, when the operator can eliminate some variables (e.g., by providing information to the context awareness engine 580) the elimination of some variables can make the learning stronger, and can make the results of real time context determination more accurate.

Meanwhile, when a phase change occurs, energy absorption becomes very high in a localized area at which the phase change is occurring. For example, when a component reaches the boiling point, the latent heat of vaporization requires a large increase in energy absorption to drive the phase change without any further increase in temperature of the component. This signature (i.e., a markedly higher localized efficiency, without a temperature increase) is extremely strong and unmistakable when it occurs. The context information associated therewith (i.e., that a component has begun to undergo a phase change) is therefore a solid marker and reliable piece of context information. By employing machine learning, the approach to phase change can also be observed and classified so that it can be recognized to either avoid phase change (e.g., take action to reduce heat application), to drive a phase change (e.g., if desirable), or to take action associated with controlling a response to a phase change (e.g., changing temperature, airflow, and/or frequency/phase application) to improve performance in the execution of a cooking recipe.

Some examples of context information that may be determinable by the context determining engine 580 may include determining a symmetric or non-symmetric load placement for the food product within the cooking chamber. In this regard, the placement of loads (e.g., individual cookie dough balls) more on one side of the cooking chamber 102, or on the top rack versus the bottom rack, can be situations that are detectable based on the RF signature data. Additionally, the RF signature data may be usable for determining the type of cookware used to support or contain the food product. For example, RF signature data may be very different for a baking stone, a stainless steel tray, or other materials including RF transparent materials. In some cases, detecting the cookware may not only be context information in and of itself, but may also communicate something about the recipe being executed (or that should be executed). For example, if a baking stone is detected, then it may be likely that a pizza recipe is being executed. If the current recipe does not match, the operator could be informed of the apparent conflict. Other types of context information that may be determinable include, for example, phase changes within the food product, temperature changes, individual component types and temperatures, current level of doneness, and/or the like.

As can be appreciated from the descriptions above, the context awareness engine 580 is effectively trained by teaching the context awareness engine 580 (e.g., with correlated signature profiles) to recognize specific contexts (i.e., situations associated with the food product, and corresponding parameters that accompany those situations) for food products within the cooking chamber 102. A trained context awareness engine 580 can then recognize context changes and current contexts within the cooking chamber 102 while cooking recipes are being executed. The operator can be notified of those context changes or of the current context, and either enabled (or prompted) to take action. However, in other cases, automatic responses or actions can be prescribed to modify oven operation to improve cooking performance.

As shown in FIG. 7, a trained instance of the context awareness engine 580 can use the library of signature profiles for comparison purposes to detect current context information within the cooking chamber 102. At operation 700, current RF signature data may be received (and/or recorded). The current RF signature data may then be compared to signature profiles (e.g., in the library of signature profiles) at operation 710. Based on this comparison, context information (i.e., current context) associated with the food product in the cooking chamber 102 may be determined and classified or otherwise identified at operation 720. Thereafter, an optional step of performing a function execution may be performed in association with the context information that was determined at operation 730. Some examples of function execution may include initiating various changes to the operation of the oven. For example, those changes may include a change in frequency or phase of the RF energy provided into the cooking chamber 102, stopping or starting the provision of the RF energy into the cooking chamber 102, changing the temperature or amount of air flow into the cooking chamber 102, etc. Another function execution example may include providing a notification to an operator of the oven 100 regarding the context determined. After the function execution is performed, a check may be conducted to determine whether the desired result has been achieved (e.g., whether the function execution has achieved a desired cooking result) at operation 730. If the desired result has been achieved, the cooking cycle may be ended. Otherwise, the method may loop back to the beginning for continued operation.

In an example embodiment, an oven (and/or a method for controlling operations of the oven) may be provided. The oven may include a cooking chamber configured to receive a food product, an RF heating system configured to provide RF energy into the cooking chamber using solid state electronic components to heat the food product, and a context awareness engine. The context awareness engine may include processing circuitry configured to receive RF signature data (including measurements of at least forward power and reflected power) associated with provision of RF energy into the cooking chamber, and to correlate an RF signature with a phenomenon observed with respect to the food product to define a signature profile for the phenomenon observed.

In some embodiments, additional optional features may be included or the features described above may be modified or augmented. Each of the additional features, modification or augmentations may be practiced in combination with the features above and/or in combination with each other. Thus, some, all or none of the additional features, modification or augmentations may be utilized in some embodiments. For example, in some cases, the phenomenon observed may be correlated with the RF signature automatically by machine learning. Alternatively or additionally, the phenomenon observed may be correlated with the RF signature manually by an operator. In an example embodiment, receiving the RF signature data may include receiving the RF signature data in real time, and correlating the RF signature with the phenomenon observed may also be performed in real time during a cooking operation involving the oven. Alternatively or additionally, receiving the RF signature data may include receiving the RF signature data as previously recorded data, and correlating the RF signature with the phenomenon observed may also be performed post hoc (i.e., after the fact) relative to a cooking operation during which the RF signature data was generated. In an example embodiment, the previously recorded data may be recorded on the oven or on a different oven. In some cases, the processing circuitry may be further configured to receive current RF signature data responsive to a cooking operation being performed on the food product in the cooking chamber, perform a comparison of the current RF signature data to a library of signature profiles, and classify context information based on the comparison. In an example embodiment, the processing circuitry may be further configured to perform a function execution associated with the context information classified. In various example situations, performing the function execution may include initiating a change in frequency or phase of the RF energy provided into the cooking chamber, stopping the provision of the RF energy into the cooking chamber, providing a notification to an operator of the oven, initiating a change in a temperature setting for the cooking chamber, or initiating a change in air flow into the cooking chamber. In an example embodiment, classifying context information may include determining a symmetric or non-symmetric load placement for the food product, determining an occurrence of a phase change in the food product, determining a temperature of each component of a multi-component instance of the food product, or determining a type of cookware supporting the food product. In some cases, classifying context information may further include determining a location of the food product or the cookware within the cooking chamber.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An oven comprising:
   a cooking chamber configured to receive a food product; and
   a radio frequency (RF) heating system configured to provide RF energy into the cooking chamber using solid state electronic components to heat the food product; and
   a context awareness engine comprising processing circuitry configured to:
      receive RF signature data associated with provision of RF energy into the cooking chamber, the RF signature data including measurements of at least forward power ($P_{fwd}$) and reflected power ($P_{refl}$),
      correlate an RF signature with a phenomenon observed with respect to the food product to define a signature profile for the phenomenon observed, and
      initiate a change in air flow into the cooking chamber based on the signature profile.

2. The oven of claim 1, wherein the phenomenon observed is correlated with the RF signature automatically by machine learning.

3. The oven of claim 1, wherein the phenomenon observed is correlated with the RF signature manually by an operator.

4. The oven of claim 1, wherein receiving the RF signature data comprises receiving the RF signature data in real time, and
   wherein correlating the RF signature with the phenomenon observed is also performed in real time during a cooking operation involving the oven.

5. The oven of claim 1, wherein receiving the RF signature data comprises receiving the RF signature data as previously recorded data, and
   wherein correlating the RF signature with the phenomenon observed is also performed post hoc relative to a cooking operation during which the RF signature data was generated.

6. The oven of claim 5, wherein the previously recorded data was recorded on a different oven.

7. The oven of claim 1, wherein the processing circuitry is further configured to:
   receive current RF signature data responsive to a cooking operation being performed on the food product in the cooking chamber;
   perform a comparison of the current RF signature data to a library of signature profiles; and
   classify context information based on the comparison.

8. The oven of claim 7, wherein the processing circuitry is further configured to:
   perform a function execution associated with the context information classified.

9. The oven of claim 8, wherein performing the function execution comprises initiating a change in frequency or phase of the RF energy provided into the cooking chamber.

10. The oven of claim 8, wherein performing the function execution comprises stopping the provision of the RF energy into the cooking chamber.

11. The oven of claim 8, wherein performing the function execution comprises providing a notification to an operator of the oven.

12. The oven of claim 8, wherein performing the function execution comprises initiating a change in a temperature setting for the cooking chamber.

13. The oven of claim 7, wherein classifying context information comprises determining a symmetric or non-symmetric load placement for the food product.

14. The oven of claim 7, wherein classifying context information comprises determining an occurrence of a phase change in the food product.

15. The oven of claim 7, wherein classifying context information comprises determining a type of cookware supporting the food product.

16. The oven of claim 15, wherein classifying context information further comprises determining a location of the food product or the cookware within the cooking chamber.

17. An oven comprising:
   a cooking chamber configured to receive a food product; and
   a radio frequency (RF) heating system configured to provide RF energy into the cooking chamber using solid state electronic components to heat the food product; and
   a context awareness engine comprising processing circuitry configured to:
      receive RF signature data associated with provision of RF energy into the cooking chamber, the RF signature data including measurements of at least forward power ($P_{fwd}$) and reflected power ($P_{refl}$), and
      correlate an RF signature with a phenomenon observed with respect to the food product to define a signature profile for the phenomenon observed,
   wherein the processing circuitry is further configured to:
   receive current RF signature data responsive to a cooking operation being performed on the food product in the cooking chamber;
   perform a comparison of the current RF signature data to a library of signature profiles; and
   classify context information based on the comparison by determining a temperature of each component of a multi-component instance of the food product.

18. A method of operating an oven having a cooking chamber configured to receive a food product, the oven having a radio frequency (RF) heating system configured to provide RF energy into the cooking chamber using solid state electronic components to heat the food product, the method comprising:
   receiving current RF signature data responsive to a cooking operation being performed on the food product in the cooking chamber;
   performing a comparison of the current RF signature data to a library of signature profiles;
   classifying context information based on the comparison, and
   performing a function execution associated with the context information classified, wherein performing the function execution comprises initiating a change in air flow into the cooking chamber.

\* \* \* \* \*